United States Patent
Takagi et al.

(10) Patent No.: US 11,529,773 B2
(45) Date of Patent: Dec. 20, 2022

(54) FIBER-MATERIAL MOLDING MACHINE AND FIBER-MATERIAL MOLDING METHOD

(71) Applicant: SUBARU CORPORATION, Tokyo (JP)

(72) Inventors: Saori Takagi, Tokyo (JP); Yohei Hamamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 205 days.

(21) Appl. No.: 16/478,820

(22) PCT Filed: Jan. 22, 2018

(86) PCT No.: PCT/JP2018/001789
§ 371 (c)(1),
(2) Date: Jul. 17, 2019

(87) PCT Pub. No.: WO2018/168202
PCT Pub. Date: Sep. 20, 2018

(65) Prior Publication Data
US 2020/0055263 A1 Feb. 20, 2020

(30) Foreign Application Priority Data
Mar. 17, 2017 (JP) .............................. JP2017-052383

(51) Int. Cl.
*B29C 70/38* (2006.01)
*B29K 307/04* (2006.01)

(52) U.S. Cl.
CPC .......... *B29C 70/386* (2013.01); *B29C 70/388* (2013.01); *B29K 2307/04* (2013.01)

(58) Field of Classification Search
None
See application file for complete search history.

(56) References Cited

U.S. PATENT DOCUMENTS 4,696,707 A    9/1987   Lewis et al.
4,790,898 A * 12/1988   Woods ................... B29C 70/20
                                                156/441

(Continued)

FOREIGN PATENT DOCUMENTS

EP   2 233 625 A1   9/2010
JP   S62-108055 A   5/1987

(Continued)

OTHER PUBLICATIONS

Byung Chui Kim, Kevin Potter, Paul M. Weaver, Continuous tow shearing for manufacturing variable angle tow composites, Composites Part A: Applied Science and Manufacturing, vol. 43, Issue 8, 2012, pp. 1347-1356, ISSN 1359-835X, https://doi.org/10.1016/j.compositesa.2012.02.024. (Year: 2012).*

(Continued)

*Primary Examiner* — Matthew J Daniels
*Assistant Examiner* — Andrew L Swanson
(74) *Attorney, Agent, or Firm* — McGinn I.P. Law Group, PLLC.

(57) ABSTRACT

A molding machine places strips of a tape material side by side and molds the tape material into a molded shape having a web portion and a flange portion, the tape material including a continuous fiber bundle extending in a longitudinal direction. The molding machine includes spreading unit able to increase a width of the tape material by spreading the tape material, and a laying roller that places the tape material which has passed through the spreading unit onto a surface of a molding tool. The spreading unit continuously changes the width of the tape material to avoid generation of a gap between adjacent strips of the tape material, the adjacent strips being adjacent to each other when the tape material is placed on the surface of the molding tool, and the (Continued)

laying roller places the strips of the tape material side by side in a plurality of rows.

16 Claims, 4 Drawing Sheets

(56) References Cited

U.S. PATENT DOCUMENTS

| | | | | |
|---|---|---|---|---|
| 8,191,215 | B2* | 6/2012 | Meyer | D04H 3/04 28/282 |
| 2006/0090856 | A1* | 5/2006 | Nelson | B29C 70/386 156/510 |
| 2006/0249868 | A1 | 11/2006 | Brown et al. | |
| 2007/0026215 | A1* | 2/2007 | Bruyere | B29C 53/8016 428/300.7 |
| 2007/0029038 | A1 | 2/2007 | Brown et al. | |
| 2009/0120562 | A1* | 5/2009 | Tsotsis | B29C 70/38 156/148 |
| 2012/0076973 | A1 | 3/2012 | Guzman et al. | |
| 2014/0069576 | A1* | 3/2014 | Brown | B32B 38/1858 156/227 |
| 2015/0267329 | A1* | 9/2015 | Kirkpatrick | B29B 11/16 428/64.1 |
| 2015/0273811 | A1* | 10/2015 | Le Costaouec | B32B 5/12 156/64 |
| 2016/0122930 | A1* | 5/2016 | Le Costaouec | D03D 41/008 112/470.17 |
| 2016/0176123 | A1* | 6/2016 | Pedigo | B29C 70/382 264/258 |
| 2018/0284724 | A1* | 10/2018 | Moruzzi | B29C 70/384 |
| 2018/0319102 | A1* | 11/2018 | Kurtz | B29C 70/462 |

FOREIGN PATENT DOCUMENTS

| | | |
|---|---|---|
| JP | H07-258949 A | 10/1995 |
| JP | H11-172562 A | 6/1999 |
| JP | 2011-143610 A | 7/2011 |
| JP | 4986996 B2 | 7/2012 |
| JP | 2017-160572 A | 9/2017 |
| WO | WO 2012/024377 A1 | 2/2012 |

OTHER PUBLICATIONS

International Search Report (ISR) (PCT Form PCT/ISA/210), in PCT/JP2018/001789, dated Feb. 20, 2018 (English and Japanese versions).
PCT Form PCT/ISA/220), in PCT/JP2018/001789, dated Feb. 20, 2018 (Japanese version).
Written Opinion of the International Searching Authority (PCT/ISA/237), in PCT/JP2018/001789, dated Feb. 20, 2018 (Japanese version).
Extended European Search Report dated Oct. 9, 2020 for European Patent Application No. 18767107.8-1009.

* cited by examiner

FIBER-MATERIAL MOLDING MACHINE AND FIBER-MATERIAL MOLDING METHOD

TECHNICAL FIELD

The present invention relates to a technology of molding a tape-like continuous fiber material into a shape having a curved edge.

BACKGROUND ART

A known method of manufacturing a fiber-reinforced composite material molds a tape-like continuous fiber material (hereinafter, referred to as "tape material") to fabricate a preform having a desirable shape, and impregnates the preform in resin and hardens the preform to obtain a final product.

When a preform is fabricated, for example, an automated fiber placement (AFP) machine or an automated tape laying (ATL) machine places and lays strips of a tape material so that reinforcing fibers are aligned in a predetermined direction.

Thus, when a preform having a curved shape is fabricated, strips of a tape material are attached in a curved form to correspond to the curved shape (for example, see PTL 1).

CITATION LIST

Patent Literature

PTL 1: Japanese Unexamined Patent Application Publication No. 2011-143610

SUMMARY OF INVENTION

Technical Problem

However, when the strips of the tape material are simply attached in the curved form, the strips of the tape material may not be placed side by side without a gap.

For example, as illustrated in FIG. 4A and FIG. 4B, a preform may be fabricated, the preform having a web portion having a flat-plate-like shape curved in a width direction and flange portions vertically unidirectionally extending (formed by bending) from curved edges at both ends in the width direction of the web portion. In this case, when strips of a tape material having a constant width are simply unidirectionally placed side by side, the incidence angle of the tape material with respect to each of the flange portions may continuously change. Consequently, a gap is generated between the strips of the tape material at the flange portion, leading to a decrease in the strength of a final product.

The present invention is made to address the above-described problem and it is an object of the present invention to place strips of a tape material side by side without a gap and to properly mold the tape material into a shape having a curved flange portion.

Solution to Problem

To attain the above-described object, the invention described in claim 1 provides a fiber-material molding machine configured to place strips of a tape material side by side and mold the tape material into a molded shape having a curved flange portion, the tape material including a continuous fiber bundle extending in a longitudinal direction, the machine including:

spreading means capable of increasing a width of the tape material by spreading the tape material; and placing means configured to place the tape material which has passed through the spreading means onto a surface of a molding tool and capable of changing a direction of the tape material to be placed, in which the molded shape is a three-dimensional shape having a web portion having a curved edge and a flange portion vertically extending from the curved edge of the web portion, and in which the spreading means continuously changes the width of the tape material to avoid generation of a gap between adjacent strips of the tape material, the adjacent strips being adjacent to each other when the tape material is placed on the surface of the molding tool, and the placing means places the strips of the tape material side by side in a plurality of rows on the surface of the molding tool while placing the tape material in a curved form so that incidence angles of the strips of the tape material from the web portion to the flange portion are aligned with one another.

The invention described in claim 2 is the fiber-material molding machine described in claim 1, in which the web portion has the curved edge and another curved edge opposite to the curved edge, and in which the placing means places the tape material in a curved form with a curvature corresponding to a ratio of a length of the curved edge to a length of the other curved edge.

The invention described in claim 3 provides a fiber-material molding method including features similar to those of the fiber-material molding machine described in claim 1.

Advantageous Effects of Invention

According to the present invention, the spreading means that spreads the tape material continuously changes the width of the tape material to avoid generation of a gap between adjacent strips of the tape material, and the strips of the tape material are placed side by side in a plurality of rows on the surface of the molding tool while the tape material is placed in the curved form so that the incidence angles of the strips of the tape material from the web portion to the flange portion are aligned with one another.

Accordingly, the strips of the tape material can be placed side by side without a gap and the tape material can be properly molded into the shape having the curved flange portion.

DESCRIPTION OF EMBODIMENTS

An embodiment of the invention is described below with reference to the drawings.

Configuration of Fiber-Material Molding Machine

A configuration of a fiber-material molding machine (hereinafter, merely referred to as "molding machine") 1 according to this embodiment is described first.

Figure 1:
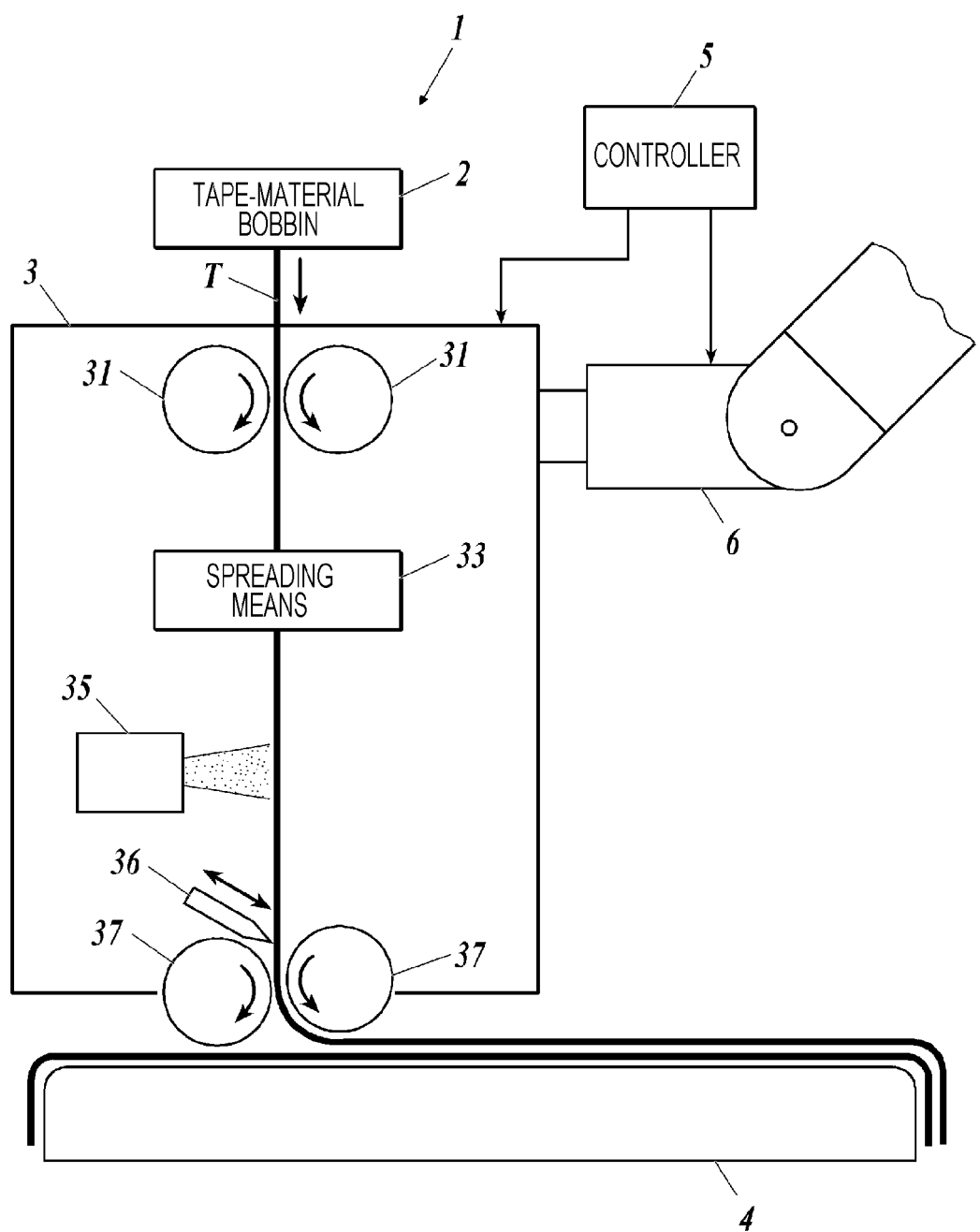
FIG. 1 is a schematic diagram of a fiber-material molding machine according to an embodiment.

FIG. 1 is a schematic diagram of the molding machine 1.

As illustrated in the figure, the molding machine 1 molds a tape material T having reinforcing fibers to fabricate a preform. In this embodiment, the molding machine 1 molds the tape material T into a molded shape having a curved flange portion. The tape material T is a dry tape-like continuous fiber bundle including a fiber bundle of continuous fibers (reinforcing fibers such as carbon fibers) extending along a longitudinal direction. In this embodiment, the fiber bundle is bound by using a thermal plasticizer or the like.

To be specific, the molding machine 1 includes a tape-material bobbin 2, a laying-device head 3, a molding tool 4, and a controller 5.

The tape-material bobbin 2 holds the tape material T wound around the tape-material bobbin 2, and supplies the tape material T to the laying-device head 3.

The laying-device head 3 is attached to a distal end of a robot arm 6 configured such that the distal end is freely movable. The laying-device head 3 pulls out the tape material T from the tape-material bobbin 2 and places (lays) the tape material T onto a surface of a molding tool 4 while being moved by the robot arm 6.

The laying-device head 3 includes, in the order from the upstream side in a feed direction of the tape material T, at least two pairs of rollers including a pair of tape-material pull-out rollers 31 that pull the tape material T from the tape-material bobbin 2, and a pair of laying rollers 37 that lay the tape material T onto the surface of the molding tool 4.

Spreading means 33, a tacking-material application device 35, and a cutter 36 are provided between the tape-material pull-out rollers 31 and the laying rollers 37.

The spreading means 33 is able to freely increase the width of the tape material T within a predetermined range by spreading the tape material T. The specific configuration of the spreading means 33 is not particularly limited and may be any configuration as long as the spreading means 33 can freely increase the width of the tape material T by spreading the tape material T. For example, the spreading means 33 may be mechanical spreading means that physically comes into contact with a tape material T and spreads the tape material T (for example, see Japanese Unexamined Patent Application Publication No. 3-146736), fluidic spreading means that causes a tape material T to pass through a fluid (air or liquid) and spreads the tape material T (for example, see Japanese Unexamined Patent Application Publication No. 11-172562), or electric spreading means that spreads a tape material T by using electric force (for example, see Japanese Unexamined Patent Application Publication No. 7-258949).

The tacking-material application device 35 applies a tacking (temporary tacking) material on one of main surfaces of the tape material T (a main surface on the lower side at laying).

The cutter 36 cuts the tape material T to have a desirable length.

The molding tool 4 is a mold base. The laying-device head 3 places (lays) the tape material T on a surface of the mold base. The molding tool 4 is formed in a shape having a flat plate portion (upper plate portion) having at least one curved edge, and a side plate portion vertically extending downward from the curved edge.

The controller 5 centrally controls operation of respective parts of the molding machine 1. To be specific, the controller 5 controls the operation of the robot arm 6 to control the position, direction, speed, and so forth, of the laying-device head 3; and controls the spreading degree of the tape material T (that is, the width of the tape material T after spreading) by the spreading means 33.

Fiber-Material Molding Method

A method of molding a fiber material (tape material T) by using the molding machine 1 is described next with a specific example.

Described here is a case where the tape material T is molded into a three-dimensional shape having a curved flange portion.

Figure 2A:
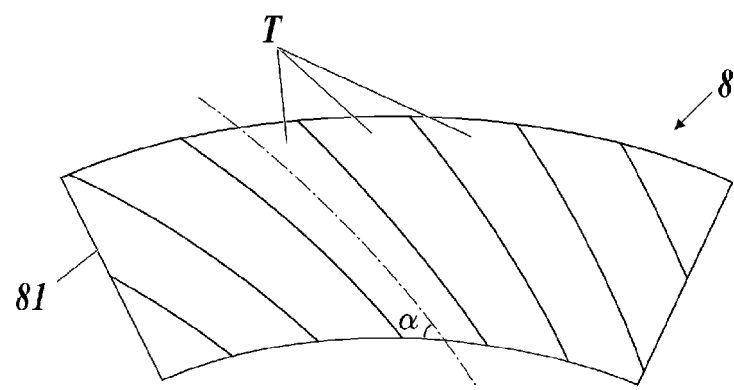
FIG. 2A is a diagram for explaining a molding example of a fiber-material molding method according to the embodiment.
Figure 2B:
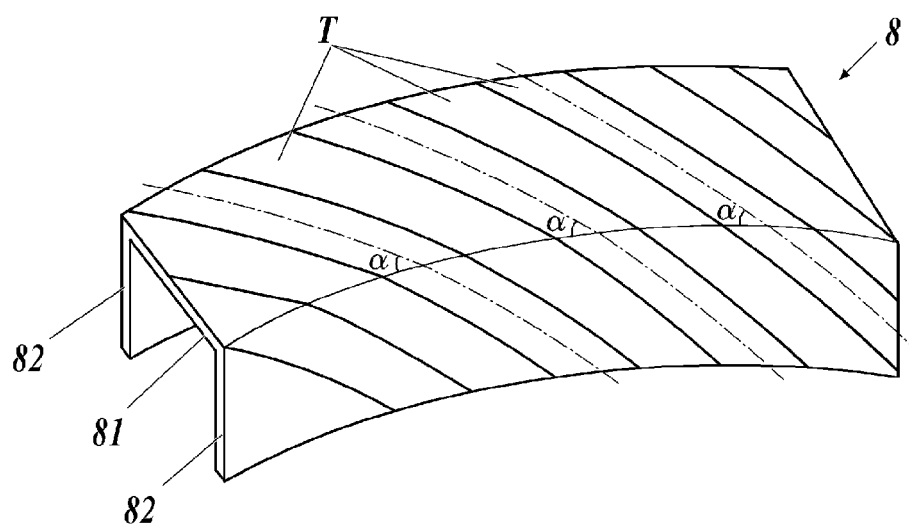
FIG. 2B is a diagram for explaining the molding example of the fiber-material molding method according to the embodiment.

FIG. 2A and FIG. 2B are diagrams for explaining a molding example.

Figure 4A:
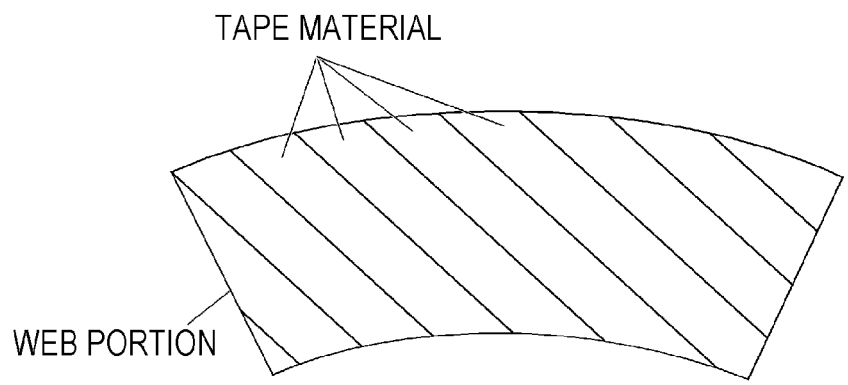
FIG. 4A is a diagram for explaining a molding example of related art.
Figure 4B:
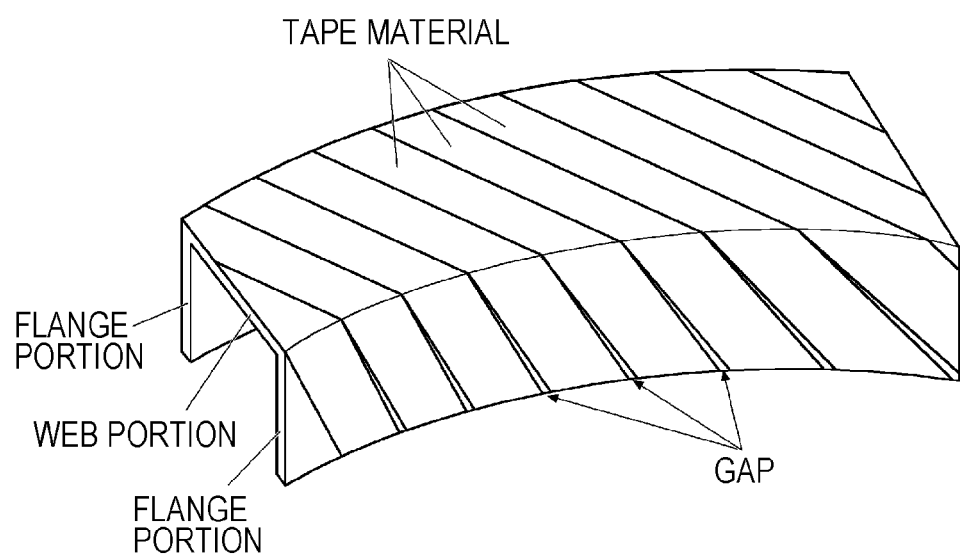
FIG. 4B is a diagram for explaining the molding example of related art.

When a ply 8 is fabricated, the ply 8 having a web portion 81 having a flat-plate-like shape curved in the width direction and two flange portions 82 vertically unidirectionally extending (formed by bending) from curved edges at both ends in the width direction of the web portion 81, if strips of a tape material T having a constant width are simply unidirectionally placed side by side, the incidence angle of the tape material T with respect to at least one of the flange portions 82 continuously changes (see FIG. 4A and FIG. 4B). Consequently, a gap is generated between the strips of the tape material T at the flange portion 82.

In the molding machine 1 of this embodiment, as illustrated in FIG. 2A and FIG. 2B, the strips of the tape material T are placed on the molding tool 4 while the incidence angles α of the strips of the tape material T from the web portion 81 with respect to at least one of the flange portions 82 are aligned with one another and the width of the tape material T is continuously changed. Thus, the strips of the tape material T are placed side by side without a gap.

To be specific, the controller 5 of the molding machine 1 causes the robot arm 6 to move the laying-device head 3 and to change the direction of the laying-device head 3, and thus the strips of the tape material T are placed in a curved form (by steering) so that the incidence angles α of the strips of the tape material T from the web portion 81 with respect to the flange portion 82 are aligned with one another. In addition, at the same time, the controller 5 causes the strips of the tape material T to be placed on the surface of the molding tool 4 while causing the spreading means 33 to continuously change the width of the tape material T so that the tape material T is widened from the curved edge on the inner side (lower side in FIG. 2A) toward the curved edge on the outer side (upper side in FIG. 2A) to fill a gap between adjacent strips of the tape material T. In this case, the curvature of the tape material T by steering is properly set to correspond to the curvatures of the two curved edges at both ends of the web portion 81 or the ratio of the lengths of the web portion 81.

While FIG. 2B illustrates only the incident angle α of the tape material T with respect to the flange portion 82 on the near side in the figure, the incidence angle of the tape material T with respect to the flange portion 82 on the far side in the figure is also aligned.

That is, in the molding machine 1, the incidence angles α of the strips of the tape material T from the web portion 81 to the flange portion 82 are aligned with one another by steering and the width of the tape material T is continuously changed to fill the gap between the strips of the tape material T at this time.

Accordingly, the strips of the tape material T can be placed side by side without a gap and the tape material T can be properly molded into the three-dimensional shape having the curved flange portion 82.

By laying the strips of the tape material T while sequentially placing the strips of the tape material T side by side, the ply 8 corresponding to the shape of the molding tool 4 is fabricated. Then, by pressing the ply 8 as necessary, a preform is completed. Then, the preform is impregnated in resin by RTM (resin transfer molding), and hence a fiber-reinforced composite material is completed.

Advantages

As described above, according to this embodiment, the spreading means 33 that spreads the tape material T continuously changes the width of the tape material T to avoid generation of a gap between adjacent strips of the tape material T, and the strips of the tape material T are placed side by side in a plurality of rows on the molding tool 4 while the tape material T is placed in a curved form so that the incidence angles α of the strips of the tape material T from the web portion 81 to the flange portion 82 are aligned with one another.

That is, the tape material T is steered so that the incidence angles α of the strips of the tape material T from the web portion 81 to the flange portion 82 are aligned with one another, and the width of the tape material T is continuously changed to fill the gap between the strips of the tape material T at this time.

Accordingly, the strips of the tape material T can be placed side by side without a gap and the tape material T can be properly molded into the shape having the curved flange portions 82.

Modifications

The embodiment to which the present invention can be applied is not limited to the above-described embodiment, and can be properly modified within a range not departing from the gist of the present invention.

For example, in the above-described embodiment, the example of the molded shape in which the flange portions 82 are vertically extending from the curved edges of the flat-plate-like web portion 81 curved in the width direction has been described; however, the molded shape to which the present invention can be applied is not particularly limited and can be any shape as long as at least one flange portion vertically extends from a curved edge of a web portion.

Figure 3A:
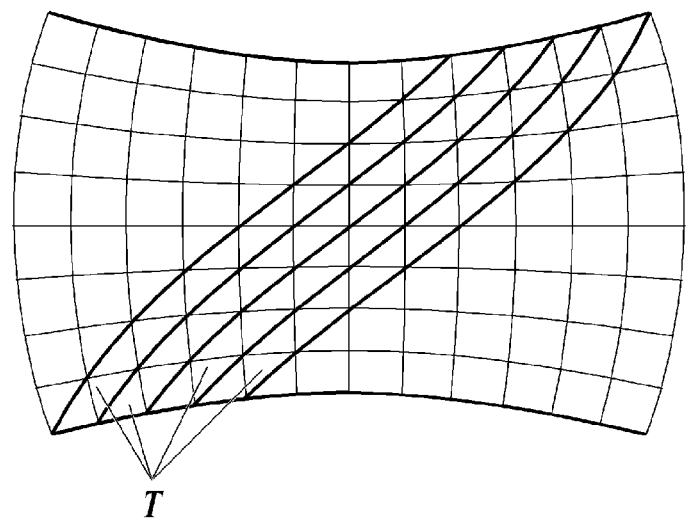
FIG. 3A is a diagram for explaining another molding example of the fiber-material molding method according to the embodiment.
Figure 3B:
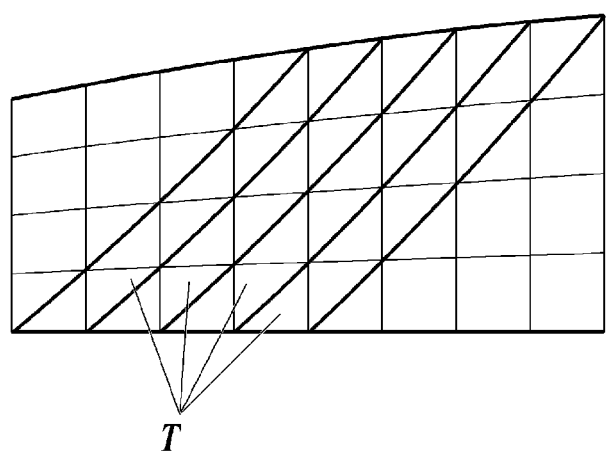
FIG. 3B is a diagram for explaining still another molding example of the fiber-material molding method according to the embodiment.

The shape of the web portion may be a shape in which two opposite curved edges are recessed as illustrated in FIG. 3A, or may be a shape in which a straight edge faces a curved edge. It is to be noted that thin lines in FIG. 3A and FIG. 3B are imaginary lines for determining the way of attaching the tape material T.

The tape material according to the present invention is not particularly limited as long as the tape material extends along a direction intersecting with the curved edges of the web portion.

INDUSTRIAL APPLICABILITY

As described above, the fiber-material molding machine and the fiber-material molding method according to the present invention are useful to properly mold a tape material into a shape having a curved flange shape.

REFERENCE SIGNS LIST 1 fiber-material molding machine
3 laying-device head
  33 spreading means
  37 laying roller
4 molding tool
5 controller
6 robot arm
8 ply
  81 web portion
  82 flange portion
T tape material
α incidence angle

The invention claimed is:

1. A fiber-material molding machine configured to place strips of a tape material side by side and mold the tape material into a molded shape having a curved flange portion, the tape material including a continuous fiber bundle extending in a longitudinal direction, the machine comprising:
   a spreading unit configured to spread and capable of increasing a width of the tape material by spreading the tape material;
   a placing unit configured to:
     place the tape material which has passed through the spreading unit onto a surface of a molding tool; and
     change a direction of the tape material to be placed; and
   a controller configured to place the tape material, by the placing unit, which has passed through the spreading unit onto a surface of a molding tool and change a direction of the tape material so that the incidence angles of the strips of the tape material from a web portion with respect to the curved flange portion are aligned with one another,
   wherein the molded shape is a three-dimensional shape having the web portion having a curved edge and the curved flange portion vertically extending from the curved edge of the web portion,
   wherein the spreading unit continuously changes the width of the tape material to avoid generation of a gap between adjacent strips of the tape material, the adjacent strips being adjacent to each other when the tape material is placed on the surface of the molding tool, and the placing unit places the strips of the tape material side by side in a plurality of rows on the surface of the molding tool while placing the tape material in a curved form to form curved strips, so that incidence angles of the curved strips of the tape material from the web portion to the curved flange portion are aligned with one another,
   wherein each of the respective incidence angles is defined as an angle between a corresponding one of the respective curved strips of the tape material and the curved edge in a surface of the web portion,
   wherein the incidence angles are non-zero, and
   wherein, after being molded into the molded shape, the tape material is impregnated in resin, including by resin transfer molding.

2. The fiber-material molding machine according to claim 1,
   wherein the web portion has the curved edge and a second another curved edge opposite to the curved edge, and
   wherein the placing unit is further configured to place the tape material in a curved form with a curvature corresponding to a ratio of a length of the curved edge to a length of the other second curved edge.

3. The fiber-material molding machine according to claim 1, wherein the surface of the web portion comprises a flat shape.

4. The fiber-material molding machine according to claim 1, wherein the placing unit places the strips of the tape material side by side in the plurality of rows on the surface of the molding tool while placing the tape material in a curved form to form curved strips, so that incidence angles of the curved strips of the tape material from the web portion to the curved flange portion are substantially equal with one another.

5. The fiber-material molding machine according to claim 1, wherein the web portion includes the curved edge and a second curved edge opposite to the curved edge, and
wherein the spreading unit varies the width of the tape material from the curved edge toward the second curved edge opposite to the curved edge.

6. The fiber-material molding machine according to claim 2, wherein the curvature of the tape material corresponds to a curvature of the curved edge at both ends of the web portion.

7. The fiber-material molding machine according to claim 2, wherein the curvature of the tape material corresponds to a ratio of a length of the curved edge of the web portion to a length of the second curved edge of the web portion.

8. The fiber-material molding machine according to claim 1, wherein an incidence angle of the tape material with respect to the curved flange portion on a first side is aligned to the incidence angle of the tape material with respect to a flange portion on a second side, the second side being opposite to the first side.

9. The fiber-material molding machine according to claim 1,
wherein the controller is further configured to control the width of the tape material, and wherein,
the controller controls the width of the tape material by the spreading unit.

10. The fiber-material molding machine according to claim 1,
wherein the controller is further configured to control the spreading unit and the placing unit.

11. A fiber-material molding method of placing strips of a tape material side by side and molding the tape material into a molded shape having a curved flange portion, the tape material including a continuous fiber bundle extending in a longitudinal direction, the method causing a fiber-material molding machine to execute:
spreading the tape material to increase a width of the tape material by; and
placing the tape material after the spreading the tape material onto a surface of a molding tool,
changing a direction of the tape material so that the incidence angles of the strips of the tape material from a web portion with respect to the curved flange portion are aligned with one another,
wherein the molded shape is a three-dimensional shape having the web portion having a curved edge and the curved flange portion vertically extending from the curved edge of the web portion,
wherein the spreading continuously changes the width of the tape material to avoid generation of a gap between adjacent strips of the tape material, the adjacent strips being adjacent to each other when the tape material is placed on the surface of the molding tool, and the placing places the strips of the tape material side by side in a plurality of rows on the surface of the molding tool while placing the tape material in a curved form to form curved strips, so that incidence angles of the curved strips of the tape material from the web portion to the curved flange portion are aligned with one another,
wherein each of the respective incidence angles is defined as an angle between a corresponding one of the respective curved strips of the tape material and the curved edge in a surface of the web portion,
wherein the incidence angles are non-zero, and
wherein, after being molded into the molded shape, the tape material is impregnated in resin, including by resin transfer molding.

12. The fiber-material molding method according to claim 11,
wherein the web portion has the curved edge and a second curved edge opposite to the curved edge, and
wherein the placing further places the tape material in a curved form with a curvature corresponding to a ratio of a length of the curved edge to a length of the second curved edge.

13. The fiber-material molding method according to claim 11, wherein the surface of the web portion comprises a flat shape.

14. The fiber-material molding method according to claim 11, wherein the placing places the strips of the tape material side by side in the plurality of rows on the surface of the molding tool while placing the tape material in the curved form to form the curved strips, so that the incidence angles of the curved strips of the tape material from the web portion to the curved flange portion are substantially equal with one another.

15. The fiber-material molding method according to claim 11, wherein an incidence angle of the tape material with respect to the curved flange portion on a first side is aligned to the incidence angle of the tape material with respect to a flange portion on a second side, the second side being opposite to the first side.

16. A fiber-material molding machine configured to place strips of a tape material side by side and mold the tape material into a molded shape having first and second curved flange portions, the tape material including a continuous fiber bundle extending in a longitudinal direction, the fiber-material molding machine comprising:
a molding tool comprising:
a flat plate-shaped portion having first and second outer edges and a flat surface placed between the first and second outer edges, the first and second outer edges facing in opposite directions;
a first curved edge formed on the first outer edge, the first curved edge being concave toward an inside of the flat plate-shaped portion;
a second curved edge formed on the second outer edge, the second curved edge being concave toward the first curved edge;
a first curved side plate extending from the first curved edge and having a first curved surface connected to the flat surface, the first curved surface being perpendicular to the flat surface; and
a second curved side plate extending from the second curved edge and having a second curved surface connected to the flat surface, the second curved surface being perpendicular to the flat surface,
a spreading unit configured to spread and capable of increasing a width of the tape material by spreading the tape material;

a placing unit configured to:
  place the tape material which has passed through the spreading unit onto a surface of the molding tool; and
  change a direction of the tape material to be placed; and
a controller configured to control the spreading unit and the placing unit,
wherein the controller is configured to, in a case where the placing unit places the tape material from the first curved surface of the first curved side plate through the flat surface of the flat plate-shaped portion to the second curved surface of the second curved side plate, change the width of the tape material to avoid generation of a gap between adjacent strips of the tape material continuously, the adjacent strips being adjacent to each other when the tape material is placed on the flat surface of the flat plate-shaped portion, and place the strips of the tape material side by side in a plurality of rows on the flat surface of the flat plate-shaped portion while placing the tape material in a curved form to form curved strips, so that first incident angles of the curved strips of the tape material are equal with one another and second incident angles of the curved strips of the tape material are equal with one another, wherein each of the respective first incidence angles is defined as an angle between a corresponding one of the respective curved strips of the tape material and the first curved edge in the flat surface of the flat plate-shaped portion, and wherein each of the respective second incidence angles is defined as an angle between a corresponding one of the respective curved strips of the tape material and the second curved edge in the flat surface of the flat plate-shaped portion.

* * * * *